US008381834B2

(12) United States Patent
Barhitte et al.

(10) Patent No.: US 8,381,834 B2
(45) Date of Patent: Feb. 26, 2013

(54) DRIVE SYSTEM FOR INTERCONNECTING ATTACHMENT DEVICES AND HANDHELD ROTARY POWER TOOLS

(75) Inventors: Josh Barhitte, Chicago, IL (US); Hiram Aburto, Puerto Peñasco (MX); Ernesto Candia, Mexkall (MX); Andy G. Meyers, Wheeling, IL (US)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 12/700,338

(22) Filed: Feb. 4, 2010

(65) Prior Publication Data
US 2011/0186316 A1    Aug. 4, 2011

(51) Int. Cl.
E21B 3/00 (2006.01)
E21B 17/22 (2006.01)
E21B 19/16 (2006.01)
E21B 19/18 (2006.01)
B25B 13/46 (2006.01)

(52) U.S. Cl. .................... 173/214; 173/164; 173/29
(58) Field of Classification Search .............. 173/29–37, 173/216–217, 213; 464/52–53, 57; 74/502.6; 403/374.2; 279/143–144, 403; 409/175–182, 409/231–234; 285/249, 125.1
See application file for complete search history.

(56) References Cited

U.S. PATENT DOCUMENTS

| 2,618,940 | A | * | 11/1952 | Wyzenbeek | 464/52 |
| 3,505,831 | A | * | 4/1970 | Beach et al. | 464/53 |
| 3,724,561 | A | * | 4/1973 | Merrels | 173/50 |
| 3,759,336 | A | * | 9/1973 | Marcovitz et al. | 173/213 |
| 4,541,160 | A | * | 9/1985 | Roberts | 29/401.1 |
| 4,949,463 | A | * | 8/1990 | Chen | 30/500 |
| 4,989,323 | A | * | 2/1991 | Casper et al. | 30/296.1 |
| 5,626,474 | A | * | 5/1997 | Kukla et al. | 433/141 |
| 5,863,159 | A | * | 1/1999 | Lasko | 408/124 |
| 6,035,515 | A | * | 3/2000 | Baer et al. | 29/505 |
| 6,463,824 | B1 | * | 10/2002 | Prell et al. | 74/417 |
| 6,508,475 | B1 | * | 1/2003 | Strodtman et al. | 279/46.3 |
| 6,712,368 | B2 | * | 3/2004 | Bohn et al. | 279/143 |
| 6,790,144 | B2 | * | 9/2004 | Talesky | 464/53 |
| 7,004,668 | B2 | * | 2/2006 | Lombardo et al. | 403/293 |
| 7,052,382 | B2 | | 5/2006 | Baker | |
| 7,077,736 | B2 | * | 7/2006 | Uzumcu et al. | 451/359 |
| 7,241,117 | B2 | * | 7/2007 | Baer et al. | 417/360 |
| 2011/0186322 | A1 | * | 8/2011 | Wasielewski | 173/213 |

FOREIGN PATENT DOCUMENTS
EP    1454710    9/2004
WO    WO 2008/013680    1/2008

* cited by examiner

*Primary Examiner* — Robert Long
(74) *Attorney, Agent, or Firm* — Maginot, Moore & Beck

(57) ABSTRACT

A drive system for releasably interconnecting a motor shaft of a rotary hand held power tool and an input shaft of an attachment device. The system includes an elongated flexible drive shaft connected to the input shaft, wherein the flexible drive shaft has an outer end portion with a non-circular cross-section configured to engage a complementarily shaped cavity of an output shaft operatively attached to the power tool motor shaft, where the output shaft has a generally cylindrical outer configuration along its length and a rearward mounting portion for attachment to the motor shaft, an intermediate portion having the complementarily shaped cavity for receiving the flexible drive shaft and a forward portion with an enlarged concentric opening for receiving and guiding the outer end portion of the flexible drive shaft into the cavity during mounting the attachment device on the power tool.

12 Claims, 4 Drawing Sheets

DRIVE SYSTEM FOR INTERCONNECTING ATTACHMENT DEVICES AND HANDHELD ROTARY POWER TOOLS

BACKGROUND OF THE INVENTION

The present invention generally relates to small handheld power tools, and more particularly to a dust collection attachment system for such tools.

Small handheld power tools that perform drilling, sawing and other types of cutting and the like are known in the prior art and have been widely used by hobbyists, artisans, tradesmen and others in a wide variety of applications. Such rotary hand tools generally have a motor with a rotary output shaft that extends from a nose portion that is more recently configured to connect to various accessories or attachment devices. Some of these rotary hand tools are quite powerful for their size and are used by tradesmen in the building trades as spiral saws that use a side cutting rotary bit to penetrate and rapidly cut holes in drywall sheets and other materials for electrical switches, outlets, light fixtures and the like.

As is known in the art, such rotary hand tool tasks can be more easily performed by using an attachment device that is attached to the tool. For example, a right angle attachment device may be mounted on the power tool and such devices may be configured to drive a circular saw blade, a grinding wheel, a sanding pad or polishing pad.

Such a right angle attachment device has an input shaft that must be interconnected with the output shaft of the tool when the attachment device is mounted on the tool. The interconnection can present problems resulting from the relatively high speed operation, together with misalignment of the two shafts, which can create undesirable vibration. A drive system that minimizes such vibration and facilitates quick and easy mounting and removal of such attachment devices is desirable.

SUMMARY OF THE INVENTION

Embodiments of the present invention are directed to a drive system for releasably interconnecting a motor shaft of a rotary hand held power tool and an input shaft of an attachment device that is mounted thereon, the system comprising, an elongated flexible drive shaft connected to the input shaft of the attachment device, the flexible drive shaft having an outer end portion with a non-circular cross-section configured to engage a complementarily shaped cavity of an output shaft operatively attached to the power tool motor shaft, an elongated output shaft operatively connected to the motor shaft of the power tool, the output shaft having a generally cylindrical outer configuration along its length and having a rearward mounting portion for attachment to the motor shaft, an intermediate portion having the complementarily shaped cavity for receiving the flexible drive shaft and a forward portion with an enlarged concentric opening for receiving and guiding the outer end portion of the flexible drive shaft into the cavity during mounting the attachment device on the power tool.

DETAILED DESCRIPTION

The present invention is directed to a drive system for releasably interconnecting an output shaft of a rotary handheld power tool or the like and an input shaft of an attachment device that is mounted on the power tool. Such a drive system may be particularly desirable for small handheld power tools having an elongated housing with a rotary output shaft is provided at a nose portion thereof, wherein the nose portion is configured to attach an attachment device thereto. Such an attachment device may be a right angle drive which has its own output shaft that may drive a circular saw blade, grinding wheel, or the like.

The attachment device has an input shaft that must be interconnected with the output shaft of the power tool and it has been known that the interconnection of these two components can produce undesirable levels of vibration at relatively high operating speeds if there is misalignment of the shafts. Such vibration can be reduced by having the input shaft of the attachment device be made of a flexible material, which can be a multiplicity of parallel steel wires that are compressed under high pressure to form a shaft having a non-circular end, and preferably a square end, for engagement with the output shaft of a power tool, but which is sufficiently flexible that it can compensate for slight misalignment and significantly reduce vibration that would otherwise occur. Such flexible shafts are known in the prior art.

Embodiments of the drive system of the present invention greatly facilitate easy and fast mounting of an attachment device to such a power tool without interfering with a common use of the power tool where a collet and collet nut can be installed to attach standard tool bits to the output shaft, such as spiral saw bits and the like.

Figure 1:
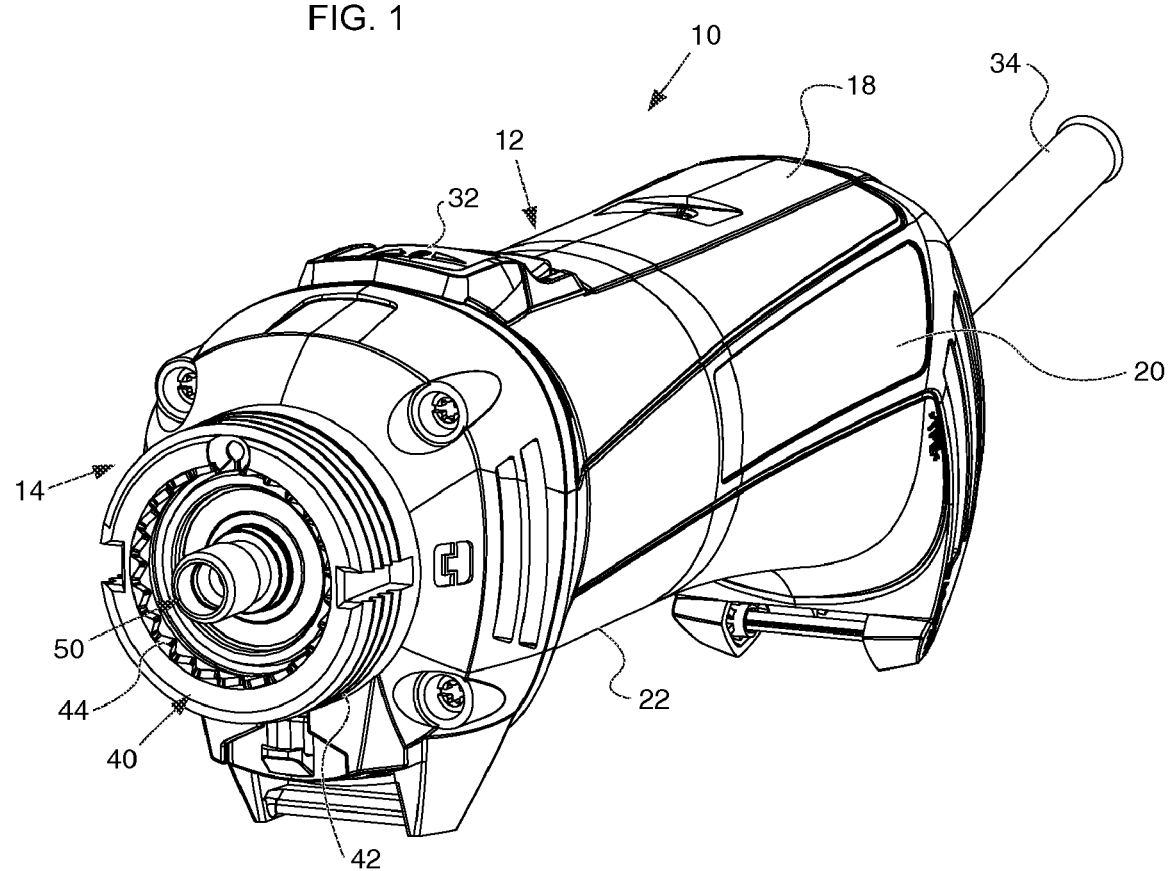
FIG. 1 is an isometric view taken from the front left of a rotary handheld power tool that incorporates an embodiment of the present invention.

Turning now to the drawings and particularly FIG. 1, an elongated power tool, indicated generally at 10, is shown and has an elongated housing, indicated generally at 12, and a nose portion, indicated generally at 14. The housing has a top surface 18, side surfaces 20 and a bottom surface 22 and a motor is contained within the housing. The size of the housing 12 is such that most users can grip the tool with one hand with their fingers curling around under the bottom portion 22. When a person is holding the tool 10 as described, their thumb is in position to operate a switch 32 which turns on the motor for operating the tool. The switch 32 is preferably designed so that can be slidingly moved between its ON and OFF positions. The tool 10 shown in FIG. 1 has a power cord 34 that can be plugged into a source of AC power. It should be understood that power tools similar to that shown in FIG. 1 may incorporate battery packs and in such event, they may be slightly larger. The present invention is suited for use with power tools that use such power packs.

The nose portion 14 has an attachment interface that is described in a co-pending patent application entitled "AN ATTACHMENT INTERFACE FOR ROTARY HAND TOOLS", Ser. No. 12/700,003 (U.S. Patent Application Publication No. 2011/0188957), that is filed concurrently with this application and is incorporated by reference herein. The nose portion, which may be made of aluminum, has a cylindrical wall, indicated generally at 40, which has outer threads 42, as well as an inner surface that has a number of keys 44 that are configured to engage complementary shaped keys on an attachment device that may be mounted on the nose portion 14.

Figure 3:
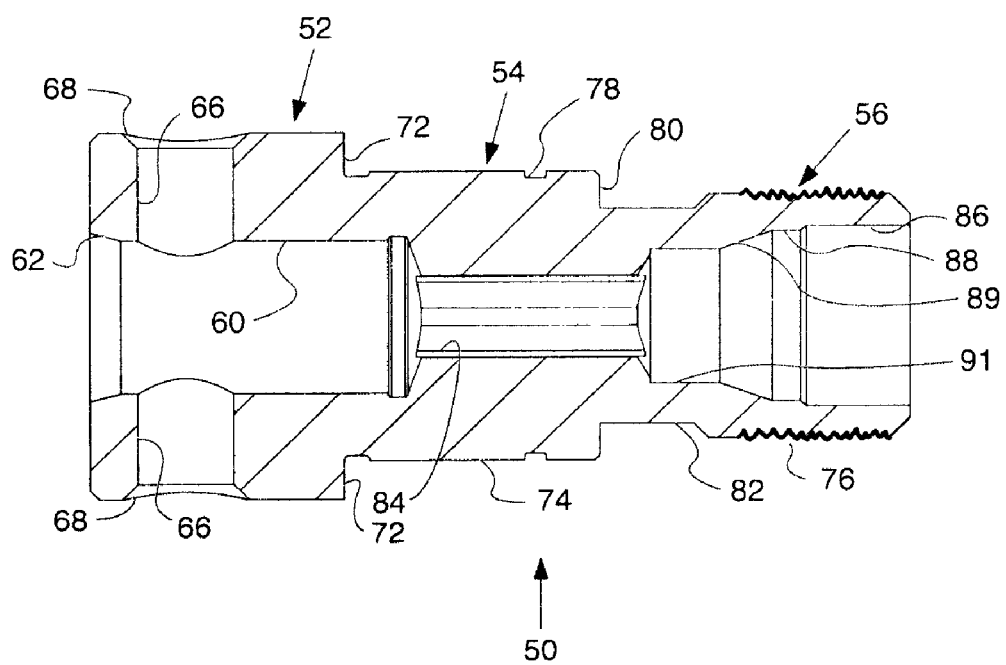
FIG. 3 is a cross section taken through the center of the output shaft of the tool shown in FIG. 1.

The tool 10 has an output shaft, indicated generally at 50, which is best shown in FIGS. 1 and 3 which is configured to be able to accept a collet and collet nut for mounting a cylindrical tool bit, such as spiral bit, for example, and is also configured to accept an input shaft of an attachment device that can be mounted on the nose portion 14 of the tool 10.

The output shaft 50, which may be made of steel, is best shown in FIG. 3 and has a rearward (i.e., the left end) mounting portion, indicated generally at 52, for attachment to a drive shaft of the motor of the power tool 10, which is an armature shaft of the motor, an intermediate portion, indicated generally at 54, that is configured to receive an input shaft (which may also be made of steel) of the attachment device and a forward portion, indicated generally at 56, that is configured to initially guide the input shaft of an attachment device into the intermediate portion 54 as well as interact with a collet and collet nut for mounting a tool bit to the output shaft 50. It is noted that the three portions, i.e., the mounting portion, intermediate portion and forward portion are approximately equal in length, although the proportions of each relative to the other may be varied as desired.

With regard to the mounting portion 52, it has a central bore 60 that has a chamfered end surface 62 to facilitate entrance by the armature shaft 64 (see FIGS. 7, 8) of the tool motor. The bore 60 preferably is only slightly larger than the outer diameter of the armature shaft 64, so that it is securely fastened therein after the mounting portion is compressed or crimped onto the shaft 64. The mounting portion 52 also has radial openings 66, each with a chamfered outer surface 68 which is sized to receive a pin of a locking mechanism for locking the output shaft from rotation so that a tool bit can be firmly secured in a collet by tightening a collet nut.

The mounting portion 52 has the largest diameter of any of the portions 52, 54 or 56 and the interface between the mounting portion 52 and the intermediate portion 54 defines an annular shoulder 72. The intermediate portion 54 has an outer surface 74 that has a diameter slightly larger than the outer surface 76 of the forward portion 56 so that a front bearing (104, FIGS. 7 and 8) can be easily slipped on the forward end 56 without interference with the inside surface of the inner race of such a bearing and be mounted on the outer surface 74 of the intermediate portion 54. The outer surface 74 also has an annular groove 78 for receiving a retaining ring (112, FIGS. 7 and 8) that holds the front bearing in place.

The interface between the intermediate portion 54 and the forward portion 56 defines another shoulder 80 and the smallest outside diameter of the entire output shaft 50 is surface 82. The surface 76 is slightly larger in diameter and it contains threads which are not shown but are well known to those of ordinary skill in the art for screwing or threading a collet nut onto the forward portion of the output shaft 50.

The bore 60 of the mounting portion 52 is in communication with a cavity 84 that has a preferably square cross section. In this regard, the cross sectional configuration of the cavity 84 can be any non-circular shape that is complementary to the shaft that is inserted into it. This cavity 84 has a length sufficient to hold a complementary shaped shaft (98, FIGS. 7 and 8) that may be inserted into the forward end portion 56. It should be understood that any noncircular type of cross section that will enable rotation of the output shaft 50 to positively rotate a shaft that is located within it may be used. Thus, a five sided or hexagonal or other noncircular cross-sectional shape may be used. However a square cross-section is preferred because it does not require close tolerances between the size of the cavity 84 and the size of an input shaft that may be inserted in it.

The forward end portion 56 has an initial cylindrical bore portion 86 as well as a smaller step down portion 88 that in turn merges with an inclined conical portion 89 as well as a smaller diameter portion 91 that communicates with the cavity 84. The progressively smaller inside diameters from the outer end extending inwardly facilitate easy initial insertion of an input shaft from an attachment device and effectively guides the same so that it can be inserted into the cavity 84.

Figure 2:
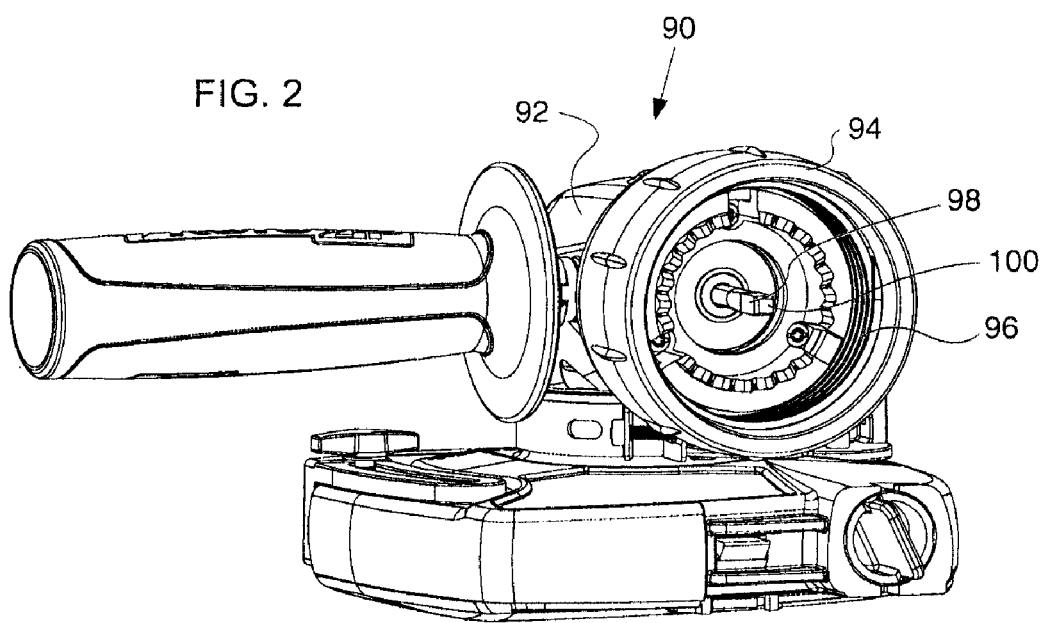
FIG. 2 is an isometric view of a right angle attachment device which also incorporates an embodiment of the present invention, with the attachment device being capable of being mounted to the power tool shown in FIG. 1.

An attachment device is indicated generally at 90 in FIG. 2 and comprises a right angle saw attachment device which can be mounted on the tool. The device will not be described in detail inasmuch as the present invention deals with only the interconnection of it with the tool on which it is mounted. In this regard, the device 90 has a main housing 92 and a rotatable collar 94 with internal threads 96 that are sized and configured to thread the collar 94 onto the threads 42 of the nose portion 14 of the powertool 10.

The device 90 has an input shaft 98 which has a square outer end 100 that is sized and configured to fit within the cavity 84. The input shaft 98 is preferably permanently secured such as being crimped in a gear shaft in the attachment device 90 so that it will not be lost when the attachment device is separated from the power tool 10. The length of the shaft 98 is sufficiently long so that the outer square cross-section end portion 100 will penetrate the output shaft 50 so that it substantially fills the cavity 84 when the device is secured to the tool 10.

Figure 7:
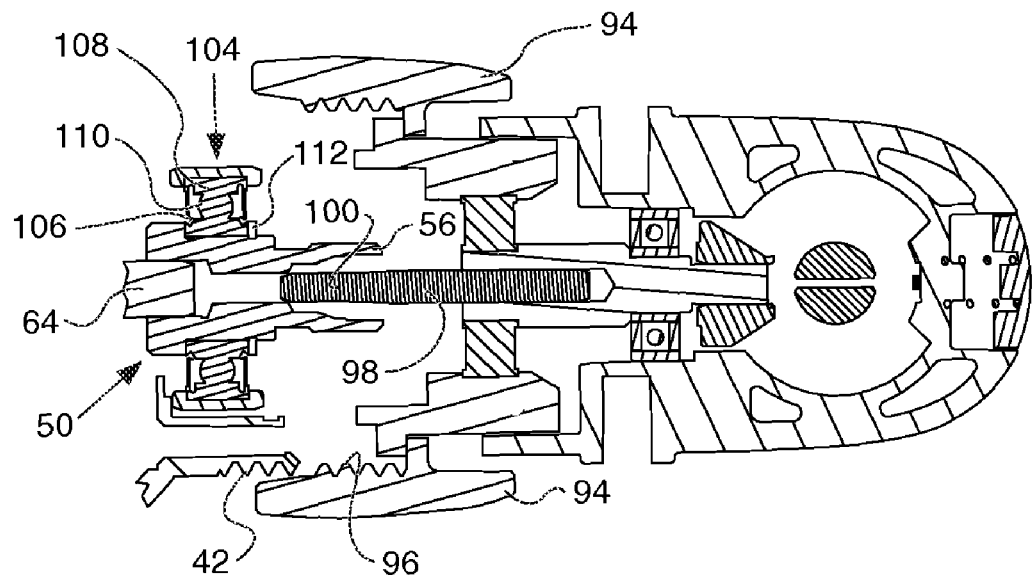
FIG. 7 is a cross-section of a portion of the power tool shown in FIG. 1, with the attachment device shown in FIG. 2, with both being shown in cross section generally through the center thereof, but illustrating the attachment device in position where it is beginning to be mounted to the power tool.

In this regard, the view of FIG. 7 shows the device with the end portion 100 penetrating into the forward portion 56 of the output shaft 50 before the collar 94 is threaded or screwed onto threads 42 of the nose portion 14 as shown in FIG. 7. When it is tightened as shown in FIG. 8, the square end portion 100 is fully inserted into the cavity 84.

Figure 8:
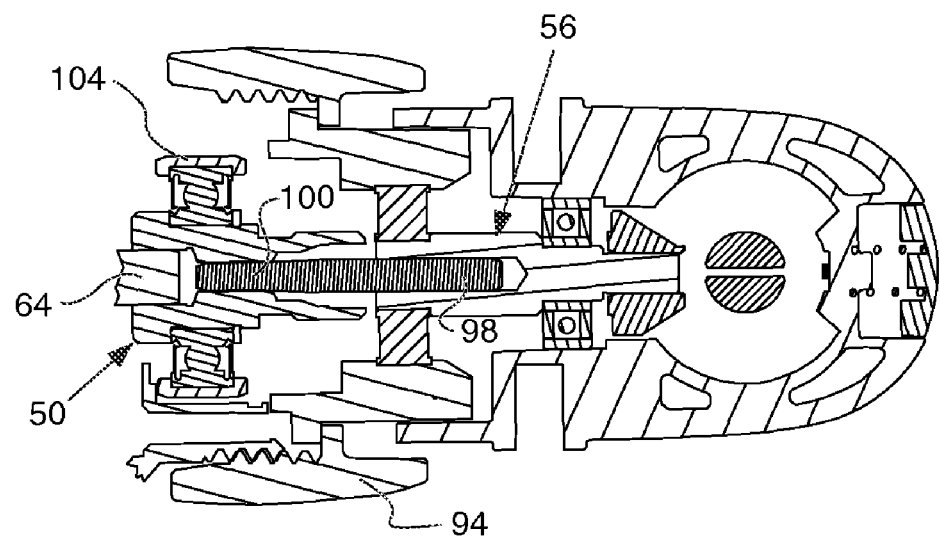
FIG. 8 is a cross-section similar to FIG. 7, but showing the attachment device attached thereto, and more particularly showing the attachment device mounted and secured to the power tool.

Parenthetically, FIGS. 7 and 8 diagrammatically show a front bearing 104 with inner and outer races 106 and 108 with ball bearings 110 therebetween and a retaining clip 112 is located in the annular groove 78. It is also noted that the mounting portion 52 is not completely shown in these drawings.

Figure 4:
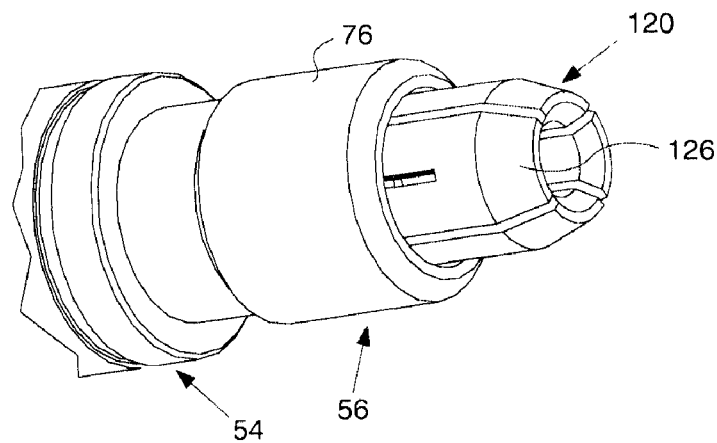
FIG. 4 is an isometric view of a portion of the output shaft shown in FIG. 3, having a collet inserted in the outer end thereof.
Figure 5:
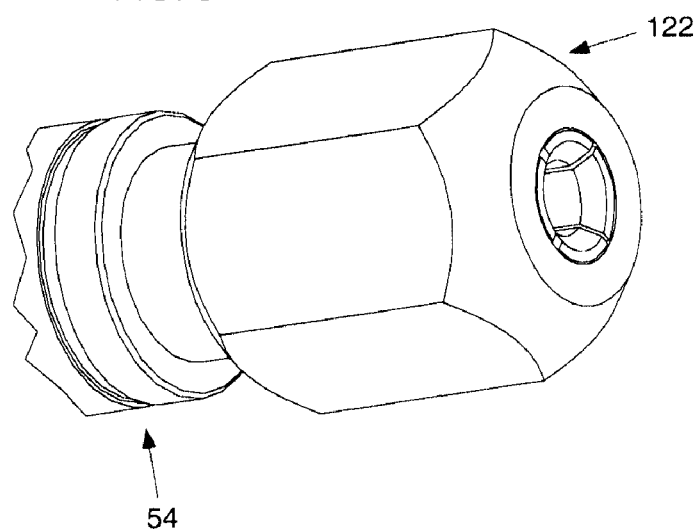
FIG. 5 is a view similar to FIG. 4 wherein a collet nut is attached to the output shaft.
Figure 6:
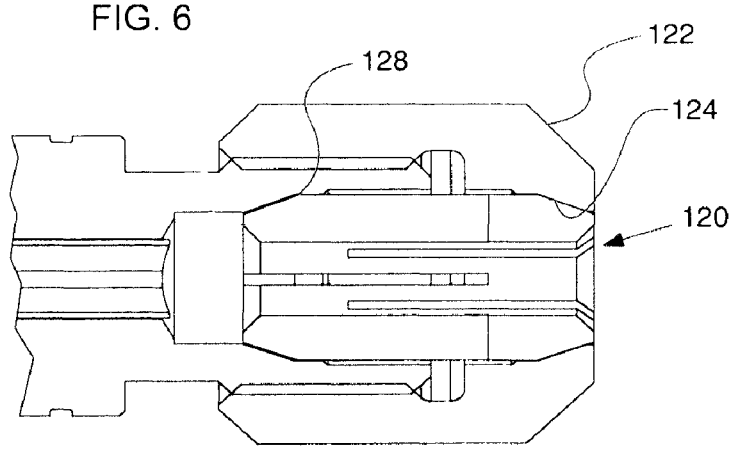
FIG. 6 is a cross-section taken generally through the middle of the output shaft, collet and collet nut shown in FIG. 5.

As previously mentioned, the forward portion 56 is configured to receive a collet and to this end, and referring to FIGS. 4, 5 and 6, a collet 120 is shown to fit within the bore 86. The collet 120 is only partially inserted in the bore 86 in FIG. 4. A collet nut 122 is configured to be threaded onto the threaded surface 76. As is typical, the collet nut has an inclined inner surface 124 that interacts with an inclined outer surface 126 on the collet and another inclined surface 128 engages the surface 89 (FIG. 3) of the forward portion 56 as is known to those of ordinary skill in the art. When the collet nut 122 is tightened, the internal diameter of the central opening is reduced to provide a holding force on a tool bit inserted in the collet 120.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A drive system for releasably interconnecting a motor shaft of a rotary hand held power tool and an input shaft of an attachment device that is mounted thereon, said system comprising:
an elongated flexible drive shaft connected to the input shaft of the attachment device, said flexible drive shaft having an outer end portion with a non-circular cross-section configured to engage a complementarily shaped cavity of an output shaft operatively attached to the power tool motor shaft;
an elongated output shaft operatively connected to the motor shaft of the power tool, said output shaft having a generally cylindrical outer configuration along its length and having a rearward mounting portion for attachment to said motor shaft, an intermediate portion having said complementarily shaped cavity for receiving said flexible drive shaft and a forward portion with an enlarged concentric opening for receiving and guiding the outer end portion of said flexible drive shaft into said cavity during mounting the attachment device on the power tool;
wherein:
the rotary tool comprises an elongated housing with a nose portion having an opening concentric for accessing said output shaft, the nose portion including a transition portion with an inclined outer surface extending radially inwardly toward the motor shaft and a generally cylindrically shaped wall extending from the transition portion concentrically and forwardly and having a plurality of screw threads formed in an outer surface of the wall,
the attachment device has a screw threaded collar rotatably attached thereto for mounting the attachment device to the nose portion of the power tool, wherein the collar is screwed onto the screw threads of the wall of the nose portion to secure the same thereto, the outer end portion of said flexible drive shaft extending forwardly of the attachment device a distance sufficient to enter said enlarged concentric opening of said forward portion of said output shaft before the collar is screwed onto the screw threads of the wall of the rotary tool; and
said intermediate portion has an outside diameter that is larger than the outside diameter of said threaded outside surface and said mounting portion has an outside diameter that is larger than the outside diameter of said intermediate portion to form an annular shoulder at the interface between said portions, said system further comprising a bearing having inner and outer races, said inner race of which fits on said outside surface of said intermediate portion and bears against said shoulder, said outer race of which fits within an inside surface of said cylindrically shaped wall, said bearing providing stability countering side forces applied to said output shaft.

2. A drive system as defined in claim 1 wherein said intermediate portion has at least one annular groove positioned adjacent an end of said race opposite said end bearing against said shoulder, said groove being configured to receive a clip for holding the bearing in place.

3. A drive system as defined in claim 1 wherein said elongated flexible drive shaft is formed of a plurality of strands of flexible steel wire that are fused together under high pressure and heat to form a unitary shaft.

4. A drive system as defined in claim 1 wherein said output shaft and said attachment device input shaft are made of steel.

5. A drive system as defined in claim 1 wherein the nose portion of the housing of the power tool is made of aluminum.

6. A drive system as defined in claim 1, further comprising a front bearing configured and arranged to rotatably support said output shaft, wherein said front bearing rotatably contacts said output shaft at said intermediate portion.

7. A drive system as defined in claim 1, wherein said generally cylindrical outer configuration at said intermediate portion of said output shaft defines a cylindrical bearing surface.

8. A drive system as defined in claim 1 wherein said non-circular cross section of said flexible drive shaft and the cross section of said complementarily shaped cavity are generally square.

9. A drive system as defined in claim 1 wherein said output shaft has a cylindrical opening sized to snugly accept said motor shaft, said output shaft being attached to the motor shaft by crimping, via compression, the output shaft against the motor shaft.

10. A drive system as defined in claim 1 wherein the input shaft of the attachment device is cylindrically shaped and has a cylindrical concentric opening in the outer end thereof, said flexible drive shaft is connected to said input shaft by inserting the flexible drive shaft into said opening and crimping, via compression, the input shaft against said flexible drive shaft.

11. A drive system as defined in claim 1 wherein said each of said mounting portion, said intermediate portion and said forward portion of said output shaft comprises approximately one third of the length of said output shaft.

12. A drive system as defined in claim 1 wherein said mounting portion of said output shaft has at least one radial opening in the outer surface thereof configured to receive a portion of a shaft lock mechanism for preventing rotation of the tool motor shaft.

* * * * *